March 10, 1925.

J. F. WILLIAMS

REGULATOR FOR OIL FUEL BURNERS

Filed Oct. 30, 1922

1,528,903

Inventor
James F. Williams

Patented Mar. 10, 1925.

1,528,903

UNITED STATES PATENT OFFICE.

JAMES FLEMING WILLIAMS, OF HAMILTON, ONTARIO, CANADA.

REGULATOR FOR OIL-FUEL BURNERS.

Application filed October 30, 1922. Serial No. 598,050.

*To all whom it may concern:*

Be it known that I, JAMES FLEMING WILLIAMS, a citizen of the United States of America, and resident of the city of Hamilton, county of Wentworth, Province of Ontario, in the Dominion of Canada, have invented certain new and useful Improvements in a Regulator for Oil-Fuel Burners, described in the following specification and illustrated in the accompanying drawings that form part of the same.

The principal objects of this invention are to effect the maintenance of a steady flame from the burner by automatically regulating the flow of oil and to devise a form of regulator which will automatically adjust itself to suit variable conditions of heat requirement and which will be self-cleansing, thereby obviating restriction to the flow of oil.

The principal feature of the invention consists in the novel construction and arrangement of parts whereby the flow of oil from the regulator is governed by an adjustable valve, which valve is automatically operated by a float within an oil chamber adapted to raise the valve to increase the volume of flow from the regulator.

Figure 1:
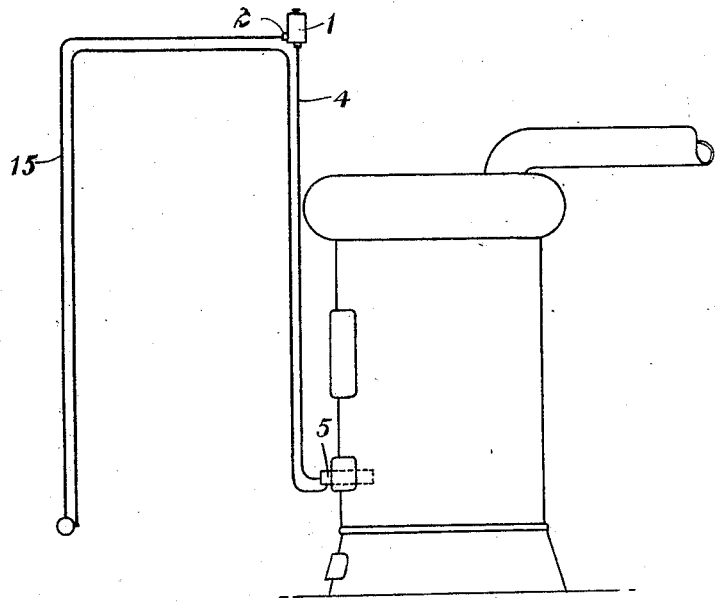

In the accompanying drawings, Figure 1 is a diagram showing the arrangement of the regulator in relation to a furnace and burner.

Figure 2:
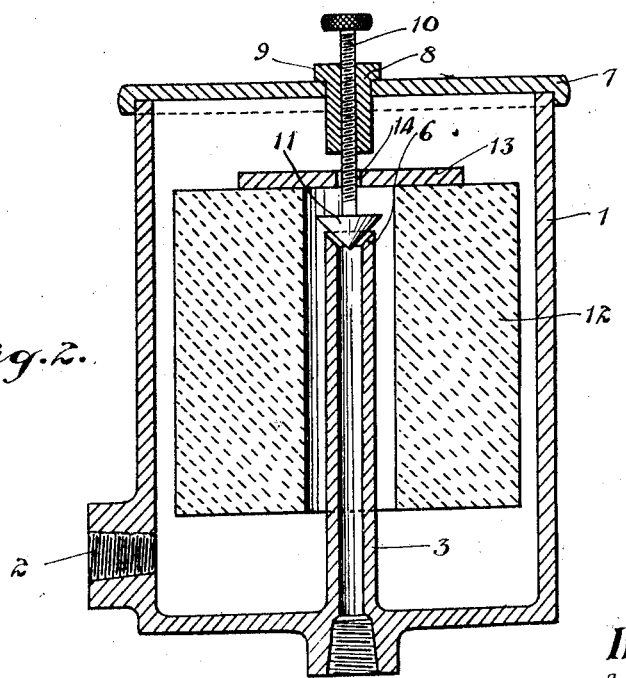

Figure 2 is a vertical sectional view through the regulator.

The form of the regulator herein shown comprises a cylindrical body 1 having an oil inlet 2 in the side wall adjacent to the bottom and a central hollow stem 3 leads upwardly from the bottom axially thereof. The hollow stem is connected with the oil feed pipe 4 leading to the burner 5. The upper end of the hollow stem 3 is formed with a tapered seat 6.

A cap 7 closes the top of the body 1 and centrally in this cap is arranged a nut 8 adapted to slide vertically in the cap having a flange 9 to limit its downward movement. This nut is threaded centrally to receive the threaded stem 10 of the tapered valve 11.

The valve is supported immediately above the valve seat 6 and may be adjusted in the nut to the desired distance from the seat to permit a predetermined flow of oil into the hollow stem 3 from the chamber within the body 1.

A cylindrical float 12 loosely encircles the stem 3 and is provided with a plate 13 on the top which has a central hole 14 through which the valve stem 10 passes freely but the plate is adapted to engage the bottom end of the nut 8 when the float rises high enough to bring it into contact.

Oil is fed to the regulator through a pipe 15 to the inlet 2 and it rises in the chamber of the body 1 until it flows over the top of the hollow stem, the flow being regulated as described by the distance the valve 11 is spaced therefrom.

The oil within the chamber supports the float 12 normally with the plate 13 a short distance below the bottom end of the nut 8. If the flow of oil to the regulator is increased beyond the normal, the float will rise until the plate 13 comes in contact with the bottom end of the nut and lifting the nut it raises the valve 11 from its seat. The outflow of oil from the regulator is thus increased until the speed of inflow of the oil is reduced.

This device is used in connection with oil burners for furnaces and the valve 11 will be set in a proper position to produce a normal flame at a certain speed of operation of the fuel pump. When a greater heat in the furnace is required the speed of operation of the fuel pump is increased which results in an increase in the speed of flow of the oil; consequently the float is raised and an increased volume of oil flows into the hollow stem 3 and feed pipe 4 leading to the burner. The increase in the flow of oil through the orifices surrounding the valve ensures the maintenance of a clean valve seat, as any deposit of grit or foreign matter will be carried away; consequently the device will be maintained in the very best operating condition at all times.

A regulator such as described is extremely simple in its construction and operation. There are no delicate parts to become damaged or get out of order, yet it is extremely sensitive and will respond readily to an increase or decrease in the speed of the oil pump.

What I claim as my invention is:—

1. A regulator for oil fuel burners, comprising, a float chamber having a tubular outlet axially arranged and extending upwardly from the bottom and connected with the oil feed to the burner, a cap closing the top of said float chamber, a nut arranged to slide axially in said cap and having a centrally threaded hole, a valve threaded in said nut and having a tapered end supported adjacent to the open end of the tubular outlet, a float arranged within the float chamber and loosely encircling the tubular outlet, and means carried by the float adapted to engage the underside of the nut to lift the valve from its seat to increase the flow of oil through the outlet.

2. A regulator for oil fuel burners, comprising, a cylindrical float chamber having an inlet at the bottom and a central axially disposed hollow stem opening through the bottom, said stem having a tapered outlet valve seat at the upper end, a valve adjustably suspended above said valve seat, a float encircling the valve stem, and a plate carried on the float loosely encircling the valve stem and adapted to engage the suspension means to raise the valve from its seat.

JAMES FLEMING WILLIAMS.